(12) United States Patent
Chebiyyam et al.

(10) Patent No.: US 11,336,998 B1
(45) Date of Patent: May 17, 2022

(54) DIRECTION OF ARRIVAL ESTIMATION

(71) Applicant: Zoox, Inc., Foster City, CA (US)

(72) Inventors: Venkata Subrahmanyam Chandra Sekhar Chebiyyam, San Francisco, CA (US); Nam Gook Cho, Cupertino, CA (US); Nathan Duarte, Foster City, CA (US); Subasingha Shaminda Subasingha, San Ramon, CA (US)

(73) Assignee: Zoox, Inc., Foster City, CA (US)

( * ) Notice: Subject to any disclaimer, the term of this patent is extended or adjusted under 35 U.S.C. 154(b) by 0 days.

(21) Appl. No.: 17/127,878

(22) Filed: Dec. 18, 2020

(51) Int. Cl.
| | |
|---|---|
| *H04R 3/00* | (2006.01) |
| *H04R 1/40* | (2006.01) |
| *B60Q 5/00* | (2006.01) |
| *B60R 16/023* | (2006.01) |
| *G10L 25/51* | (2013.01) |

(52) U.S. Cl.
CPC .............. *H04R 3/005* (2013.01); *B60Q 5/00* (2013.01); *B60R 16/023* (2013.01); *G10L 25/51* (2013.01); *H04R 1/406* (2013.01); *H04R 2499/13* (2013.01)

(58) Field of Classification Search
CPC .... H04R 3/005; H04R 1/406; H04R 2499/13; B60Q 5/00; B60R 16/023; G10L 25/51
USPC .......... 381/56, 58, 86, 91, 92, 122, 124, 302
See application file for complete search history.

(56) References Cited

U.S. PATENT DOCUMENTS

| | | | |
|---|---|---|---|
| 7,843,486 B1 * | 11/2010 | Blair .................. | H04N 21/4396 381/310 |
| 9,432,768 B1 | 8/2016 | O'Neill et al. | |
| 2012/0224456 A1 | 9/2012 | Visser et al. | |
| 2013/0301837 A1 * | 11/2013 | Kim ........................ | G10L 25/48 381/56 |
| 2015/0341719 A1 * | 11/2015 | Sun ....................... | G06V 40/161 381/92 |
| 2016/0299738 A1 * | 10/2016 | Mäkinen ................... | H04S 7/30 |
| 2019/0069080 A1 * | 2/2019 | Abrams .............. | G10L 21/0208 |
| 2019/0294169 A1 * | 9/2019 | Shabtai ................ | G05D 1/0255 |

(Continued)

FOREIGN PATENT DOCUMENTS

| | | |
|---|---|---|
| GB | 2042725 A | 9/1980 |
| WO | WO2018221057 A1 | 12/2018 |

OTHER PUBLICATIONS

International Search Report and Written Opinion for PCT Application No. PCT/US21/61982, dated Mar. 17, 2022, 9 pgs.

(Continued)

*Primary Examiner* — William A Jerez Lora
(74) *Attorney, Agent, or Firm* — Lee & Hayes, P.C.

(57) ABSTRACT

Techniques for estimating a direction of arrival of sound in an environment are discussed. First and second audio data are received from a first pair of audio sensors associated with a vehicle. A first region of ambiguity associated with the first pair of audio sensors is determined based on the first and second audio data. Third and fourth audio data are received from a second pair of audio sensors. A second region of ambiguity associated with the second pair of audio sensors is determined based on the third and fourth audio data. The regions of ambiguity can be further based on confidence levels associated with sensor or audio data. An area of intersection of the first region of ambiguity and the second region of ambiguity can be determined. A direction of arrival of an audio event can be determined based on the area of intersection.

20 Claims, 7 Drawing Sheets

(56) References Cited

U.S. PATENT DOCUMENTS

2019/0333501 A1* 10/2019 Kurtz ................. H04R 3/005
2020/0398832 A1* 12/2020 Tzirkel-Hancock .....................
B60W 30/0953

OTHER PUBLICATIONS

Zhang et al., "Self-organization of unattended wireless acoustic sensor networks for ground target tracking". Pervasive and Mobile Computing 5 (Apr. 2009) 148-164 doi:10.1016/j.pmcj.2008.05.003 pp. 148-164.

* cited by examiner

DIRECTION OF ARRIVAL ESTIMATION

BACKGROUND

A vehicle can use audio sensors to capture audio data related to vehicles, pedestrians, and other objects in an environment proximate the vehicle. Some vehicles may capture audio data from multiple audio sensors associated with the vehicle. It is important for vehicles to use the captured audio data to identify objects that may necessitate changes to the operation of the vehicle.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

This disclosure is directed to techniques for estimating a direction of arrival of a sound in an environment. In some examples, audio data may be received from audio sensors associated with a vehicle. The vehicle may be an autonomous vehicle with multiple audio sensors that capture sounds in an environment in which the vehicle is located. In some examples, pairs of audio sensors associated with a vehicle generate audio data that may be used to create a locus of points in which a source of the sound (e.g., an audio event) may be located. For example, each pair of audio sensors may be oriented along a different axis. The audio data captured by multiple pairs of audio sensors may be used to determine a direction of arrival of an audio event and determine a distance between the audio event and the vehicle.

In some examples, a computing device may receive first audio data and second audio data from a first pair of audio sensors associated with a vehicle. A first confidence level associated with the first pair of audio sensors is determined. Based at least in part on the first confidence level, a first region of ambiguity is determined, where the first region of ambiguity is associated with the first pair of audio sensors. The computing device may receive third audio data and fourth audio data from a second pair of audio sensors associated with the vehicle. A second confidence level associated with the second pair of audio sensors is determined. Based at least in part on the second confidence level, a second region of ambiguity is determined, where the second region of ambiguity is associated with the second pair of audio sensors. The computing device may further determine an area of intersection of the first region of ambiguity and the second region of ambiguity. A direction of arrival of an audio event is determined based on the area of intersection.

In some examples, the computing device may also determine a distance between the audio event and the vehicle based at least in part on the area of intersection. In some examples, a width of the first region of ambiguity may be determined based on the first confidence level. Similarly, a width of the second region of ambiguity may be determined based on the second confidence level. In some examples, the first region of ambiguity is based at least in part on a time difference of arrival (TDoA) associated with the first audio data and the second audio data. Similarly, the second region of ambiguity is based at least in part on a TDoA associated with the third audio data and the fourth audio data.

In some examples, the first confidence level or the second confidence level may be determined based on a classification of the audio event, peak cross-correlation values, a signal lag, a hardware latency, a noise profile, a sampling rate, machine learned models (e.g., neural networks), or an internal system error. In particular examples, the computing device accesses map data associated with an area proximate the vehicle and determines whether any of the audio data is likely to be a reflection. If any audio data is determined to be a reflection, confidence level(s) associated with the audio data may be down weighted or such audio data may be discarded.

In some examples, a direction of arrival can be estimated based on audio data captured by a same audio sensor at different times. For example, and as described further herein, a vehicle may traverse an environment and capture audio data at different times to localize a sound in an environment by using similar techniques as those described above.

In particular examples, an activity is initiated based on the direction of arrival of an audio event. The initiated activity may include contacting a remote computing system, changing a threshold in another perception algorithm, or initiating a vehicle maneuver.

In some examples, a computing device may receive first audio data from a first audio sensor associated with a first pair of audio sensors associated with a vehicle. Additionally, the computing device may receive second audio data from a second audio sensor associated with the first pair of audio sensors associated with the vehicle. The computing device may determine a first confidence level associated with a determination associated with the first pair of audio sensors based on an audio data sampling rate, a hardware latency, a noise profile, a baseline distance between the sensors, and the like. The computing device may further determine a first region of ambiguity associated with the first pair of audio sensors, which may be, in some examples, based on the first confidence level associated with the first pair of audio sensors. Additionally, the computing device may receive third audio data from a third audio sensor associated with a second pair of audio sensors associated with the vehicle. The computing device may also receive fourth audio data from a fourth audio sensor associated with the second pair of audio sensors associated with the vehicle. The computing device may determine a second confidence level associated with a determination made by the second pair of audio sensors based on an audio data sampling rate, a hardware latency, a noise profile, a baseline distance between the sensors, and the like. The computing device may further determine a second region of ambiguity associated with the second pair of audio sensors. In some examples, such a region of ambiguity may be based on the second confidence level associated with the second pair of audio sensors. The computing device may determine an area of intersection of the first region of ambiguity and the second region of ambiguity. The area of intersection of the first region of ambiguity and the second region of ambiguity may be associated with an audio event. The computing device may estimate a direction of the audio event (e.g., direction of arrival) with respect to the vehicle based on the area of intersection. Additionally, the computing device may estimate a distance of the audio event from the vehicle based on the area of intersection. The computing device may initiate an activity based on the estimation of the direction of the audio event and the estimation of the distance of the audio event from the vehicle.

The techniques discussed herein can improve the functioning of a vehicle in a number of ways. The described techniques may allow a vehicle's systems and methods to identify an audio event and determine both the direction of arrival of the audio event and the distance of the audio event from the vehicle. Based on the direction of arrival and the distance from the audio event, the vehicle may take an appropriate action, such as moving toward the audio event, moving away from the audio event, or taking some other action.

The techniques described herein can be implemented in a number of ways. Example implementations are provided below with reference to the following figures. Although discussed in the context of an autonomous vehicle, the methods, apparatuses, and systems described herein can be applied to a variety of systems and are not limited to autonomous vehicles. In another example, the techniques can be utilized in any type of vehicle, robotic system, or any system using audio data. Additionally, the techniques described herein can be used with real data (e.g., captured using sensor(s)), simulated data (e.g., generated by a simulator), or any combination of the two.

Figure 1:
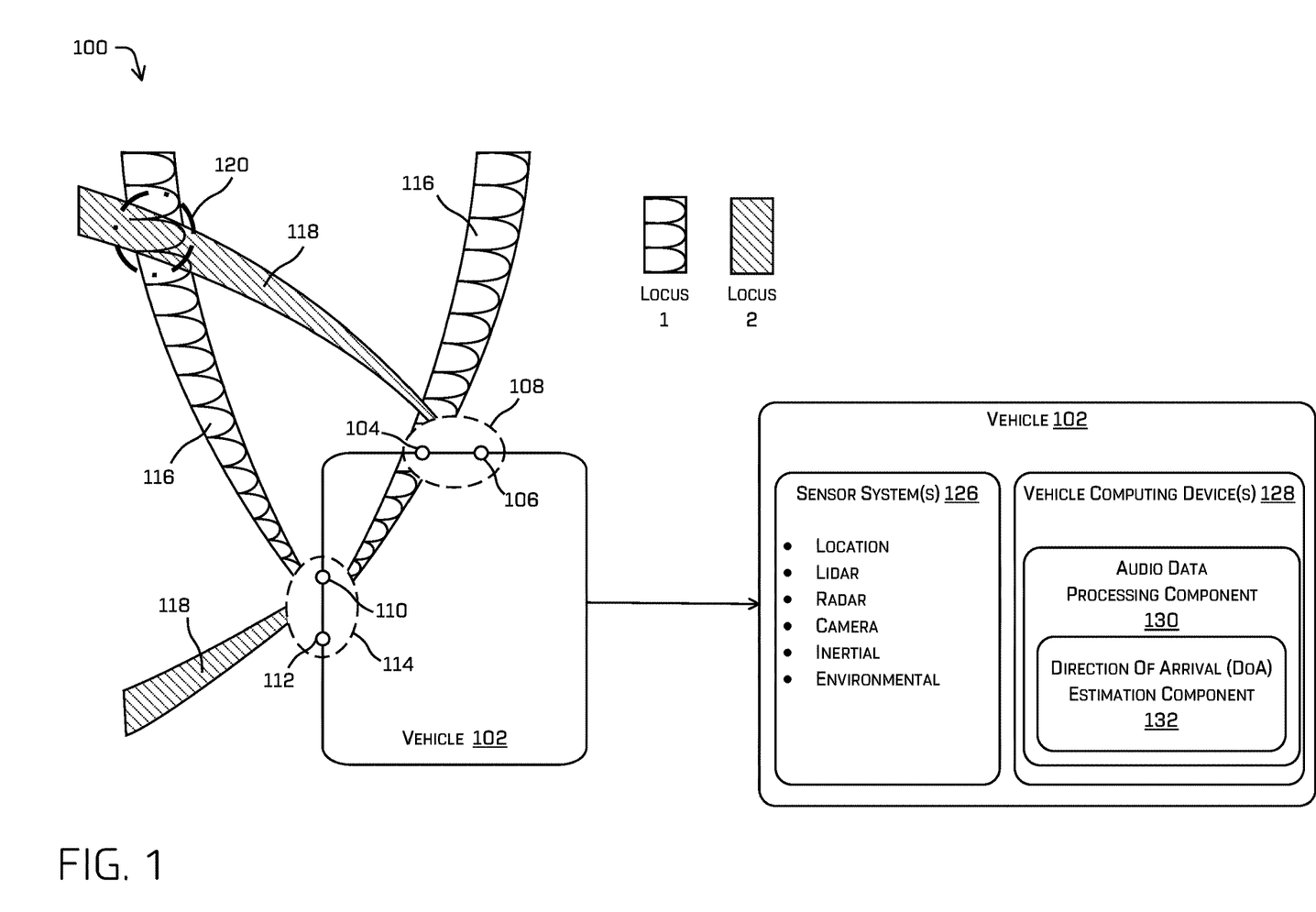
FIG. 1 is a schematic diagram illustrating an example implementation to estimate a direction of arrival of an audio event received by audio sensors associated with an autonomous vehicle, in accordance with examples of the disclosure.

FIG. 1 is a schematic diagram illustrating an example implementation 100 to estimate a direction of arrival of an audio event received by audio sensors associated with an autonomous vehicle, in accordance with examples of the disclosure. As illustrated in FIG. 1, a vehicle 102 may include any number of audio sensors (e.g., 104, 106, 110, and 112) that generate audio data representing sounds and audio events in an environment. The sounds and audio events may include, for example, emergency vehicle sirens, vehicle horns, engine sounds, tire noise, music, human speech, dog barking, and other sounds proximate the vehicle 102.

For the purpose of illustration, the vehicle 102 may be an autonomous vehicle configured to operate according to a Level 5 classification issued by the U.S. National Highway Traffic Safety Administration, which describes a vehicle capable of performing all safety critical functions for the entire trip, with the driver (or occupant) not being expected to control the vehicle at any time. In such an example, since the vehicle 102 can be configured to control all functions from start to stop, including all parking functions, it can be unoccupied. This is merely an example, and the systems and methods described herein can be incorporated into any ground-borne, airborne, or waterborne vehicle, including those ranging from vehicles that need to be manually controlled by a driver at all times, to those that are partially or fully autonomously controlled. Additional details regarding the vehicle 102 are described herein.

In one example, the vehicle 102 includes multiple audio sensors 104, 106, 110, and 112 disposed at different locations on the vehicle 102. Although four audio sensors are shown in FIG. 1, other examples may include any number of audio sensors associated with the vehicle 102. In some examples, the multiple audio sensors are positioned and oriented to capture sounds and audio events from different regions of the environment proximate the vehicle 102. For example, different audio sensors may capture sounds from the environment ahead of the vehicle 102, behind the vehicle 102, on both sides of the vehicle 102, and the like. In some implementations, all audio sensors are capturing sounds simultaneously and may be using at least a portion of the captured sounds to navigate the vehicle 102 through the environment.

In the example of FIG. 1, the multiple audio sensors 104, 106, 110, and 112 are grouped into pairs, as discussed herein. For example, audio sensors 104 and 106 are grouped into a first pair 108 and audio sensors 110 and 112 are grouped into a second pair 114. At least as illustrated in FIG. 1, each pair 108, 114 of audio sensors is oriented along a different axis. The systems and methods discussed herein determine the time difference of arrival (TDoA) of sounds at the pairs 108, 114 of audio sensors. For example, the TDoA determines the time delay between the same sound reaching each of the pairs 108, 114 of audio sensors. Each pair 108, 114 of audio sensors can determine a general direction from which a sound may be arriving.

In some examples, a locus of points over which an audio source may be located is determined based on the audio sensor data generated by each pair 108, 114 and the TDoA between the pairs 108, 114. For example, the systems and methods described herein may determine a first locus of points 116 (associated with the pair 114) and a second locus of points 118 (associated with the pair 108). As discussed herein, the first locus of points 116 and the second locus of points 118 each have a width that identifies a region of ambiguity. A wider region of ambiguity may indicate increased ambiguity in the determination of a direction of arrival and a distance of a source of the received sound. Similarly, a narrower region of ambiguity may indicate less ambiguity in the determination of a location of a source of the received sound.

In the example of FIG. 1, the first locus of points 116 intersects the second locus of points 118 at a region of intersection 120. The region of intersection 120 may indicate a direction of arrival of a received sound relative to the vehicle 102. Additionally, the region of intersection 120 may indicate a distance of the source of the received sound relative to the vehicle 102. The size of the region of intersection 120 may vary depending on the width of the region of ambiguity associated with each locus of points 116, 118. If the size of the region of intersection 120 is smaller, it may indicate a more precise location of the source of the received sound. A larger size of the region of intersection 120 may indicate a less precise location of the source of the received sound.

In addition to the audio sensors 104, 106, 110, and 112, the vehicle 102 can be associated with other sensor system(s) 126 that may be disposed on the vehicle 102. For example, the sensor system(s) 126 can include location sensors (e.g., global positioning system (GPS), compass, etc.), light detection and ranging (lidar) sensors, radio detection and ranging (radar) sensors, image sensors (e.g., cameras), inertial sensors (e.g., inertial measurement units, accelerometers, magnetometers, gyroscopes, etc.), environmental sensors (e.g., temperature sensors, humidity sensors, light sensors, pressure sensors, etc.), and the like. In some examples, audio sensors 104, 106, 110, and 112 may be any type of sensor that captures various sound data in an environment proximate the vehicle 102. The sensor system(s) 126 can generate sensor data, which may be utilized by vehicle computing device(s) 128 associated with the vehicle 102.

In at least one example, the vehicle computing device(s) 128 may receive and process audio data received from the multiple audio sensors 104, 106, 110, and 112. The received audio data may include any sound captured from the environment in which the vehicle 102 is operating.

In some examples, the vehicle computing device(s) 128 of the vehicle 102 may include an audio data processing component 130 that processes the audio data or audio signal representing the sound in an environment. The audio data processing component 130 may include a direction of arrival (DoA) estimation component 132. The DoA estimation component 132 may receive the audio data representing sound from the environment from the audio sensor(s) 104, 106, 110, and 112. As discussed herein, the DoA estimation component 132 may select one or more audio sensor pairs from the above-noted audio sensors 104, 106, 110, and 112. In some examples, the DoA estimation component 132 may estimate an angular spectrum of the audio sensor pair based at least in part on the audio data. In some examples, the DoA estimation component 132 may use a generalized cross correlation with phase transform (GCC-PHAT) algorithm to estimate the angular spectrum of the audio sensor pair, although other techniques may be used.

In at least one example, the vehicle computing device(s) 128 may determine the first locus of points 116, the second locus of points 118, and the intersection 120 of the first locus of points 116 with the second locus of points 118, as discussed herein.

Figure 2:
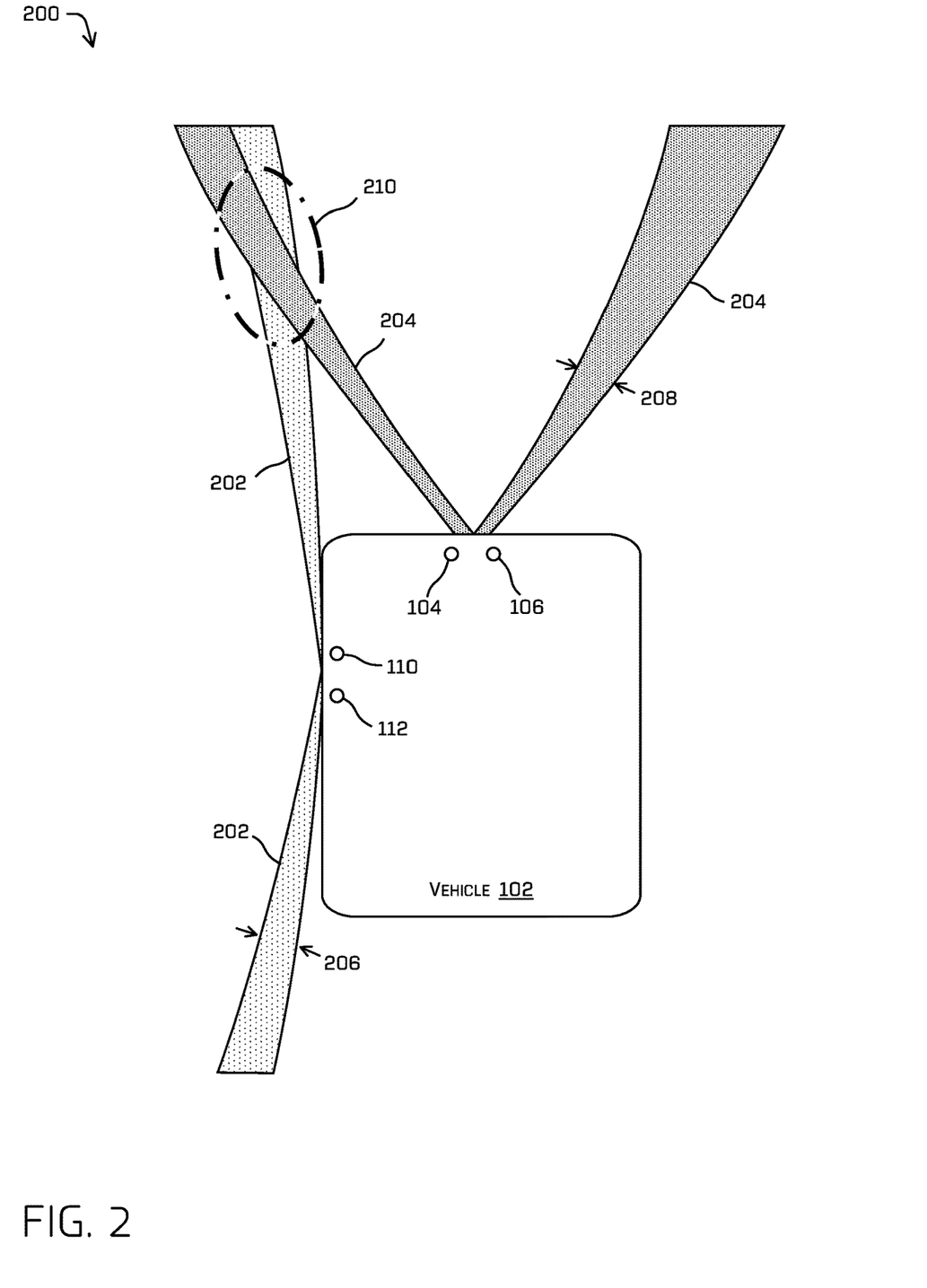
FIG. 2 is an illustration of receiving an audio event using multiple audio sensors, estimating a direction of arrival of the audio event, and estimating a distance between the audio event and a vehicle, in accordance with examples of the disclosure.

FIG. 2 is an illustration of receiving 200 an audio event using multiple audio sensors, estimating a direction of arrival of the audio event, and estimating a distance between the audio event and a vehicle, in accordance with examples of the disclosure. As discussed with respect to FIG. 1, the example vehicle 102 illustrates four audio sensors 104, 106, 110, and 112. The audio sensors 104 and 106 are grouped into a first pair 108 and audio sensors 110 and 112 are grouped into a second pair 114. Each pair 108, 114 of audio sensors is oriented along a different axis.

In the example of FIG. 2, a first locus of points 202 and a second locus of points 204 are associated with an audio event (e.g., a source of a sound). A source of a sound may lie anywhere within the first or second locus of points 202, 204. In the illustrated example, the first and second locus of points 202, 204 are based on a hyperbolic function that defines a hyperbolic region. Each pair 108, 114 of audio sensors produces two estimates, which defines the outer edges of first and second locus of points 202, 204, respectively. The outer edges of the first locus of points 202 and the outer edges of the second locus of points 204 define a width for each locus of points, which identifies a region of ambiguity. For example, the first locus of points 202 has a width 206. As shown in FIG. 2, the width 206 varies based the distance from the vehicle 102. For example, the width of the first locus of points 202 near the vehicle 102 is narrower than the width of the first locus of points farther away from the vehicle 102. Similarly, the second locus of points 204 has a width 208 that varies based the distance from the vehicle 102.

A wider region of ambiguity may indicate increased ambiguity in the determination of a location and distance of a source of the received sound. Similarly, a narrower region of ambiguity may indicate less ambiguity in the determination of a location and distance of a source of the received sound.

In the example of FIG. 2, the first locus of points 202 intersects the second locus of points 204 at a region of intersection 210. The region of intersection 210 may indicate a direction of arrival of a received sound relative to the vehicle 102. Additionally, the region of intersection 210 may indicate a distance of the source of the received sound relative to the vehicle 102. The size of the region of intersection 210 may vary depending on the width of the region of ambiguity associated with each locus of points 202, 204. If the size of the region of intersection 210 is smaller, it may indicate a more precise direction of arrival and distance of the source of the received sound. A larger size of the region of intersection 210 may indicate a less precise direction of arrival and distance of the source of the received sound.

In some examples, the width of the first locus of points 202 and the second locus of points 204 is determined based on one or more factors. These factors may be associated with a confidence level associated with each pair of audio sensors. The confidence level may identify a confidence associated with the accuracy of the audio data received from a particular pair of audio sensors. A low confidence level associated with a specific pair of audio sensors may result in a wide region of ambiguity while a high confidence level associated with the specific pair of audio sensors may result in a narrow region of ambiguity.

In some examples, a particular confidence level may be compared to a threshold confidence value. If the particular confidence level is below the threshold confidence value, that audio data and/or a region of ambiguity may be discarded or ignored. Thus, if the confidence level is too low, which may indicate inaccurate audio data, the audio data is not considered. Instead, audio data received from other pairs of audio sensors is used with the systems and methods discussed herein.

In some examples, the width of each locus of points 202, 204 may be based on a factor related to a time delay between a sound reaching the two audio sensors in a particular pair of sensors (e.g., the time delay between a sound reaching audio sensor 104 and audio sensor 106 in first pair 108). This information may be used to determine a direction of arrival based on one or more of the time delay, the position of the vehicle, the orientation of the vehicle, and the position of the audio sensors on the vehicle.

Other factors that may affect the width of each locus of points 202, 204 include a sampling rate associated with the audio sensors receiving the sound related to the locus of points, a classification of the sound event (e.g., a siren detection score), peak cross-correlation values (e.g., GCC-PHAT), a signal lag, a hardware latency, a noise profile, an internal system error, results from previous detection scores, and the like. Any of these factors that may indicate reduced accuracy may result in a wider region of ambiguity. Similarly, factors that may indicate an increased accuracy may result in a narrower region of ambiguity. For example, an increased sampling rate of an audio sensor may provide a lower error rate, which narrows the region of ambiguity.

In some examples, the region of intersection 210 is determined based on the region in which the first locus of points 202 intersects the second locus of points 204. The size of the region of intersection 210 varies based on the width of the region of ambiguity associated with each locus of points 202, 204. For example, if the region of ambiguity associated with one or both locus of points 202, 204 is narrow, the size of the region of intersection 210 will be smaller than a region of intersection with wider regions of ambiguity.

In some examples, a third pair of audio sensors are associated with vehicle 102, which are associated with a third locus of points (not shown in FIG. 2). The third locus of points may reduce the size of the region of intersection, which provides a more detailed direction and distance of the audio event.

In some examples, any two audio sensors associated with vehicle 102 may be used to create a virtual pair of audio sensors. A locus of points may be associated with the virtual pair of audio sensors in the same manner discussed herein.

In particular examples, the described systems and methods may access map data associated with an area proximate vehicle 102. When a locus of points for a particular sound is generated, the locus of points may be compared to the map data to determine whether the sound associated with the locus of points is likely to be a reflection (e.g., a reflection off a building, sign, vehicle, and the like). If the systems and methods determine that the sound associated with the locus of points is likely to be a reflection, the audio data associated with the locus of points is discarded. The audio data is discarded because any region of intersection with reflected audio data may be invalid. In this situation, the systems and methods may select a different pair of audio sensors that are not receiving reflected audio data.

Examples of determining reflected audio in an environment are provided in U.S. patent application Ser. No. 16/836,605, titled "Distinguishing Between Direct Sounds and Reflected Sounds in an Environment," filed Mar. 31, 2020, the entirety of which is herein incorporated by reference.

As discussed herein, the described systems and methods may be used to determine direction of arrival of an audio event and a distance from the audio event to the vehicle. In some examples, the direction of arrival and distance information may be used to direct additional processing resources to identify an object in the direction of arrival. The processing resources used to identify an object may include image processing resources, audio processing resources, and the like. In other examples, the direction of arrival and distance information may be used to increase data associated with the probability of different audio events (and vehicles or objects associated with the audio events) in particular geographic locations.

In some examples, features may be extracted from audio data captured by pairs of audio sensors. For example, information may be extracted using a Fourier Transform to calculate features based on cross-correlation in the Fourier domain.

In other examples, multiple loci may be generated that correspond to multiple estimates using the TDoA estimation algorithms. In a particular example, for GCC-PHAT, the systems and methods may select multiple peaks in multipole cross-correlation results to estimate multiple TDoAs, which are converted to loci.

Figure 3:
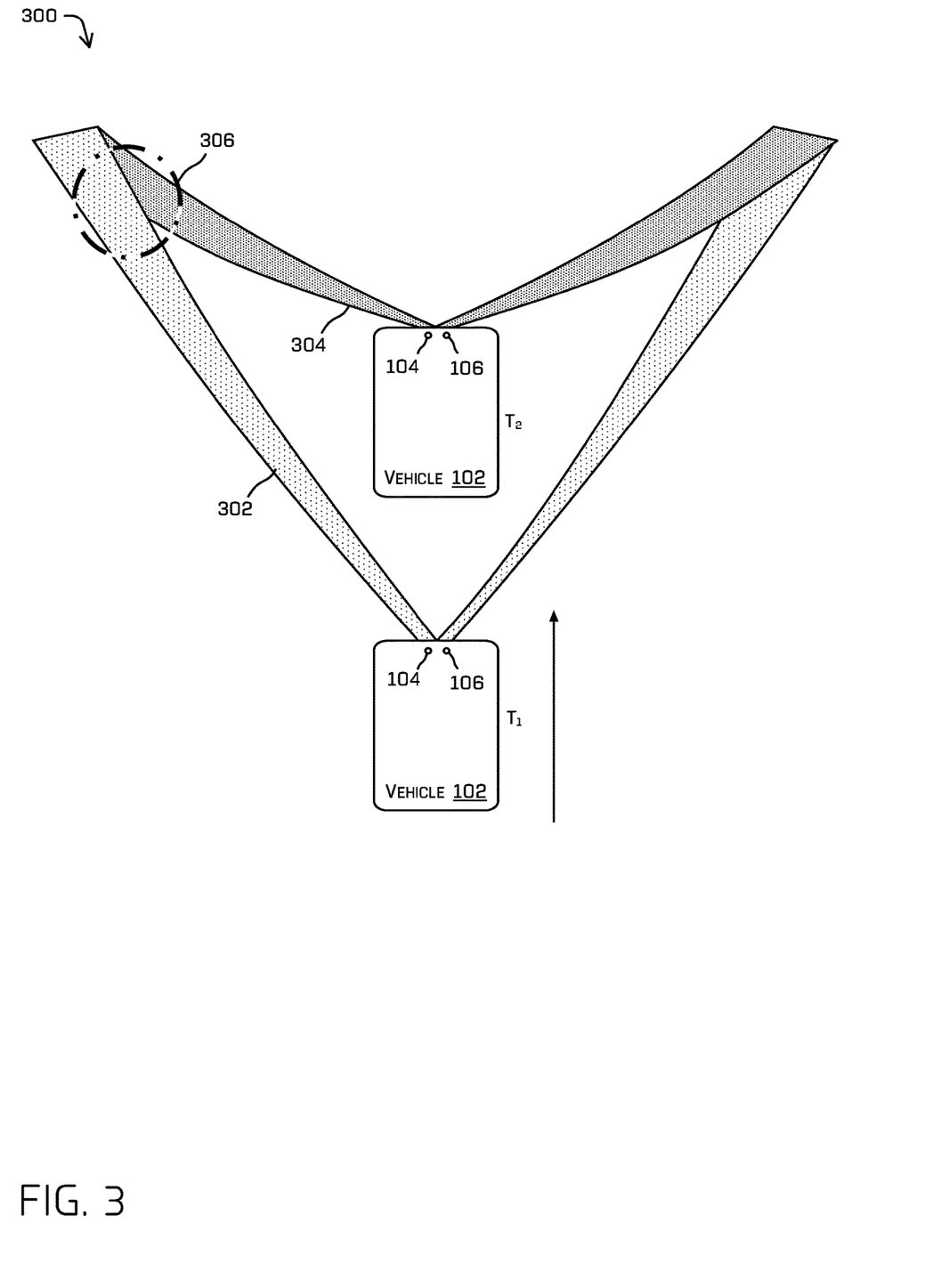
FIG. 3 is an illustration of receiving multiple audio events from a common audio source captured by the same vehicle at different times, in accordance with examples of the disclosure.

FIG. 3 is an illustration of receiving 300 multiple audio events from a common audio source captured by the same vehicle at different times, in accordance with examples of the disclosure. In particular, FIG. 3 illustrates determining, using the audio sensors 104 and 106, a first region of ambiguity 302 at time $T_1$ and a second region of ambiguity 304 at time $T_2$. As discussed above, the regions of ambiguity 302 and 304 can be based on aspects of sensor data, noise in an environment, confidence levels, and the like, and can represent an area associated with a likely source of sound. In some examples, techniques can include determining a first location at time $T_1$ to a second location at time $T_2$. The vehicle 102 can detect a sound at time $T_1$ and can determine a region of intersection 306 based on the regions of ambiguity 302 and 304.

In some examples, the region of intersection 306 can be based on tracking information determined based on other sensor modalities (e.g., image data, lidar data, radar data, time of flight data, etc.). Although only two times $T_1$ and $T_2$ are illustrated, multiple regions of ambiguity can be determined for any number of times. In some examples, a distance the vehicle 102 travels between $T_1$ and $T_2$ may be compared to a threshold distance to ensure that enough movement has occurred to ensure some parallax between the first location associated with time $T_1$ and time $T_2$.

In some examples, the region of intersection can be based on movement information associated with a source of the sound. For example, assuming that a source of the sound is moving may provide a first estimated position of sound, while assuming that a source of the sound is stationary may provide a second estimate of the location. In some examples, if a movement of the source of the sound is known, region of uncertainty information from a single time instance can be used to provide an estimate of the location of the sound in the environment.

Figure 4:
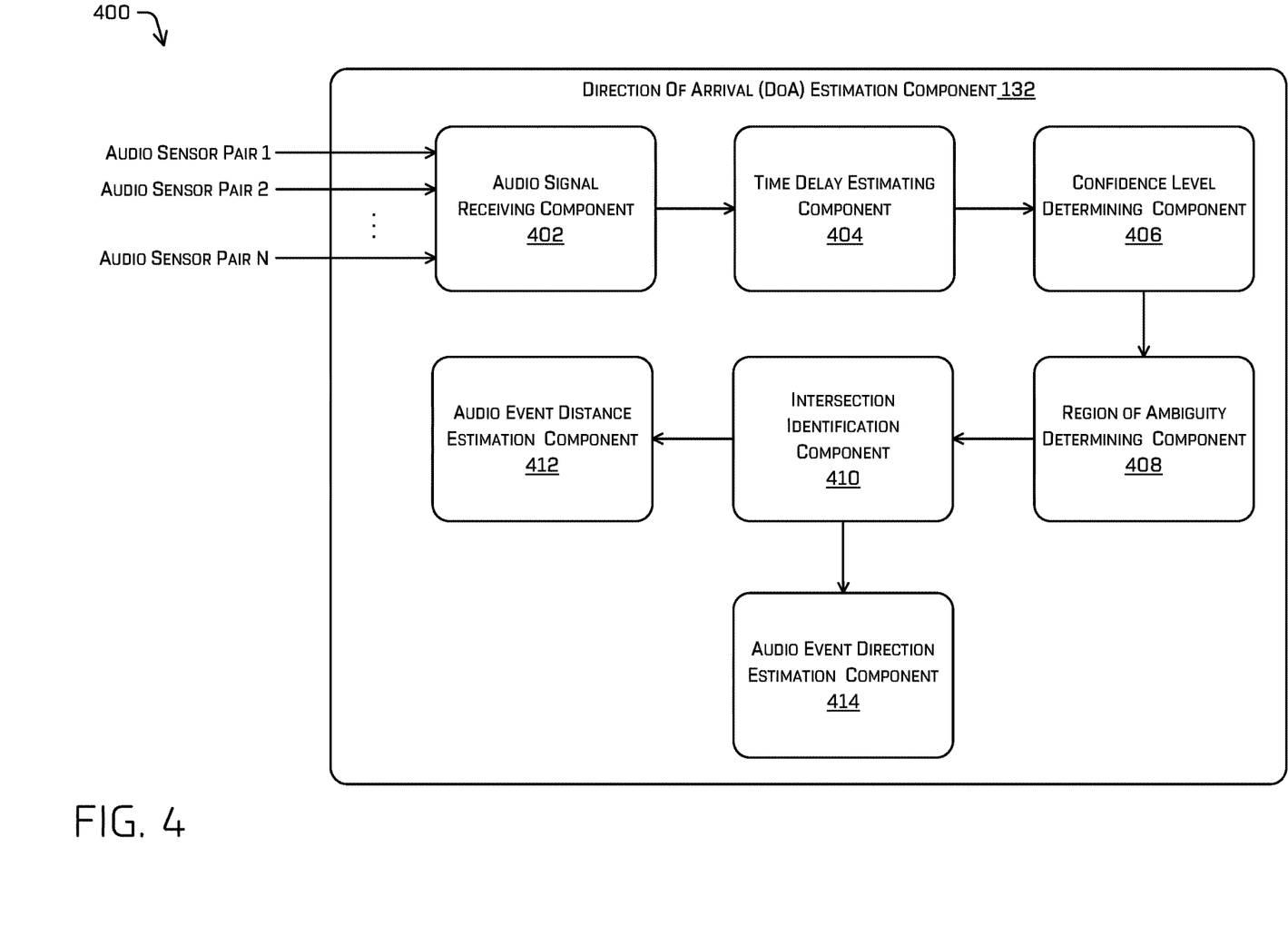
FIG. 4 is an illustration of an example process for estimating a direction of arrival of an audio event and estimating a distance between the audio event and a vehicle based on audio data received from multiple audio sensors associated with the vehicle, in accordance with examples of the disclosure.

FIG. 4 is an illustration of an example process 400 for estimating a direction of arrival of an audio event and estimating a distance between the audio event and a vehicle based on audio data received from multiple audio sensors associated with the vehicle, in accordance with examples of the disclosure. The operations described herein with respect to the process 400 may be performed by the direction of arrival estimation component 132.

An audio signal receiving component 402 receives audio data from one or more audio sensor pairs, such as audio sensor pairs 108 and 112 shown in FIG. 1. The received audio signals are provided to a time delay estimating component 404, which determines a time delay between the same sound (e.g., the same audio event) reaching each of the audio sensor pairs. This time delay is also referred to as the TDoA of the sound at the pairs of audio sensors.

A confidence level determining component 406 receives time delay information generated by the time delay estimating component 404. Based on the time delay information, the confidence level determining component 406 determines a confidence level associated with the audio data received from the audio sensor pairs. A low confidence level associated with a specific pair of audio sensors may result in a wide region of ambiguity while a high confidence level associated with the specific pair of audio sensors may result in a narrow region of ambiguity. As discussed herein, confidence level determining component 406 may consider other factors when determining a confidence level associated with the audio data received from the audio sensor pairs. In at least some examples, a threshold confidence level may be required.

A region of ambiguity determining component 408 determines the region of ambiguity associated with each pair of audio sensors. As discussed herein, the region of ambiguity for a particular pair of audio sensors is based on the confidence level determined for that pair of audio sensors. Each region of ambiguity is associated with a locus of points. An intersection identification component 410 determines a region of intersection of two or more regions of ambiguity (e.g., intersection 120 shown in FIG. 1). The intersection identification component 410 communicates the region of intersection information to an audio event distance estimation component 412 and an audio event direction estimation component 414. As discussed herein, the audio event distance estimation component 412 determines a distance between the audio event and the vehicle associated with the audio sensors based on the region of intersection. Additionally, the audio event direction estimation component 414 determines a direction of arrival of the sound associated with an audio event based on the region of intersection.

Figure 5A:
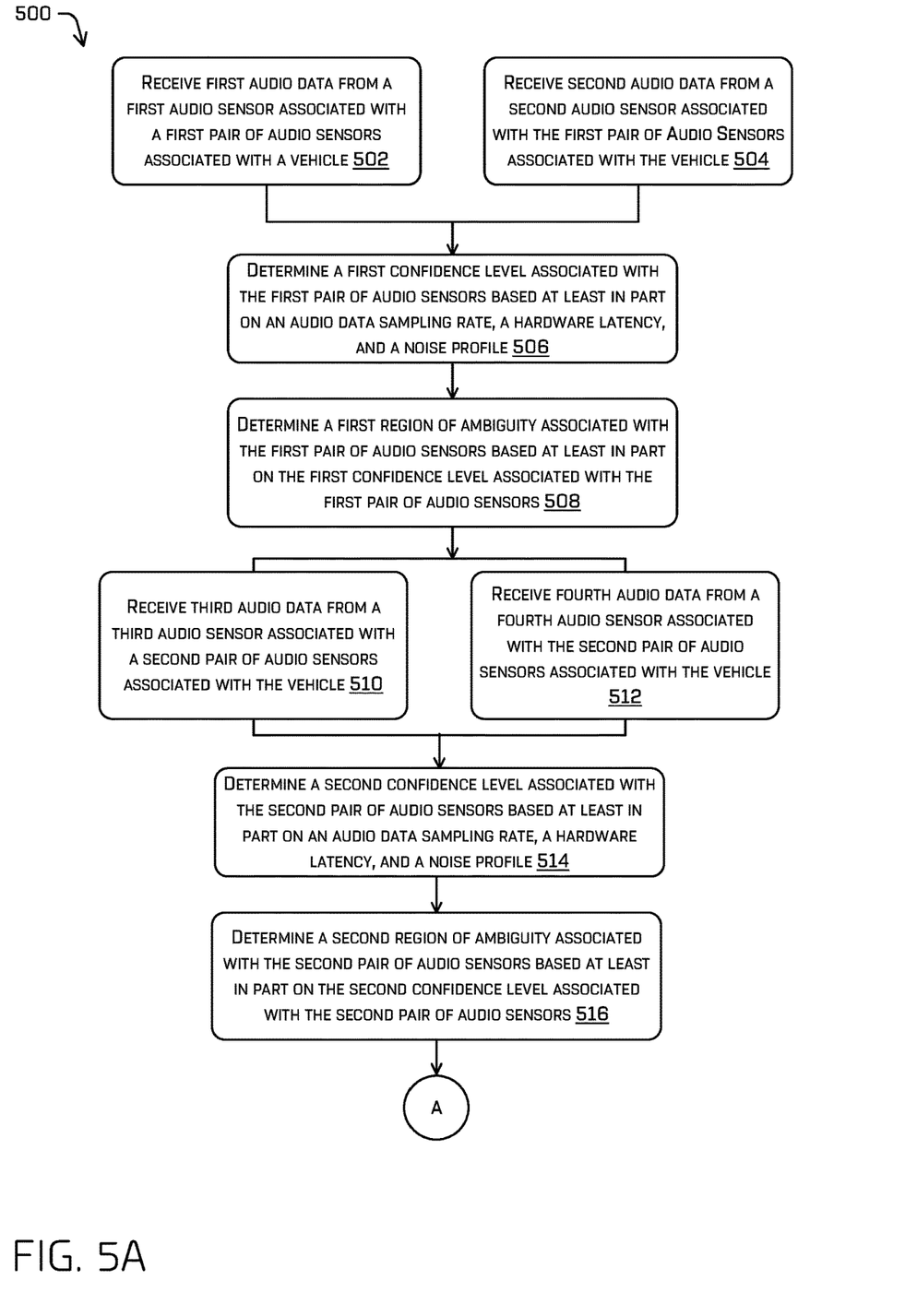
FIGS. 5A-5B illustrate an example process for estimating a direction of arrival of an audio event and estimating a distance between the audio event and a vehicle, in accordance with examples of the disclosure.
Figure 5B:
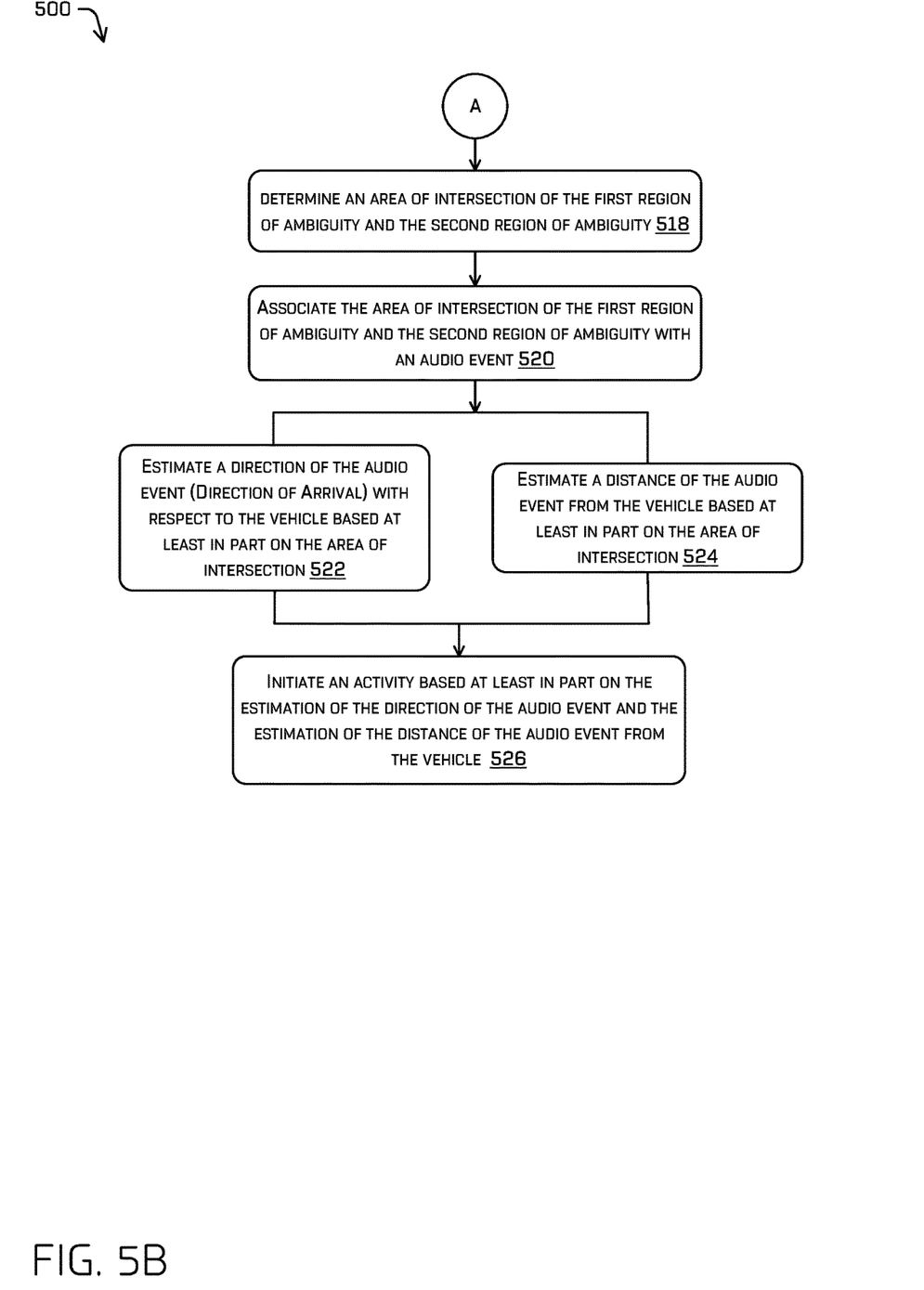

FIGS. 5A-5B illustrate an example process 500 for estimating a direction of arrival of an audio event and estimating a distance between the audio event and a vehicle, in accordance with examples of the disclosure. The operations described herein with respect to the process 500 may be performed by the vehicle computing device(s) 128, as illustrated in FIG. 1. In some examples, the operations may be performed by the direction of arrival estimation component 132 of the vehicle computing device(s) 128, as discussed herein.

By way of example, the process 500 is illustrated as a logical flow graph, each operation of which represents a sequence of operations that can be implemented in hardware, software, or a combination thereof. In the context of software, the operations may represent computer-executable instructions stored on one or more computer-readable storage media that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described operations can be combined (or omitted) in any order and/or in parallel to implement the process 500. In some examples, multiple branches represent alternate implementations that may be used separately or in combination with other operations discussed herein.

At operation 502, the process may include receiving first audio data from a first audio sensor associated with a first pair of audio sensors associated with a vehicle, such as vehicle 102, as illustrated in FIG. 1. The first audio data may be associated with an audio event captured by the first audio sensor. At operation 504, the process may include receiving second audio data from a second audio sensor associated with the first pair of audio sensors associated with the vehicle (e.g., vehicle 102). The second audio data may be associated with the same audio event captured by the first audio sensor at operation 502.

At operation 506, the process may include determining a first confidence level associated with the first pair of audio sensors based at least in part on an audio data sampling rate, a hardware latency, a noise profile, a baseline distance between the sensors, a difference in sensor types (and associated parameters), or the like. The first confidence level may identify a confidence associated with the accuracy of the audio data received from the first pair of audio sensors.

At operation 508, the process may include determining a first region of ambiguity associated with the first pair of audio sensors. In some examples, a region of ambiguity can be based at least in part on the first confidence level associated with the first pair of audio sensors. In some examples, the region of ambiguity and/or a confidence level can be determined by or received from a machine learned model, in addition to the other techniques discussed herein.

At operation 510, the process may include receiving third audio data from a third audio sensor associated with a second pair of audio sensors associated with the vehicle (e.g., vehicle 102). At operation 512, the process may include receiving fourth audio data from a fourth audio sensor associated with the second pair of audio sensors associated with the vehicle. The fourth audio data may be associated with the same audio event captured by the third audio sensor at operation 510. In some examples, the first audio data and second audio data received at operations 502 and 504, respectively, may be associated with the same audio event as the third audio data and fourth audio data received at operations 510 and 512, respectively.

At operation 514, the process may include determining a second confidence level associated with the second pair of audio sensors based at least in part on an audio data sampling rate, a hardware latency, a noise profile, a baseline distance between the sensors, a difference in sensor types (and associated parameters) and the like. At operation 516, the process may include determining a second region of ambiguity associated with the second pair of audio sensors. In some examples, the second region of ambiguity can be based at least in part on the second confidence level associated with the second pair of audio sensors.

At operation 518, the process may include determining an area of intersection of the first region of ambiguity and the second region of ambiguity. At operation 520, the process may include associating the area of intersection of the first region of ambiguity and the second region of ambiguity with an audio event. As discussed herein, the audio event may include emergency vehicle sirens, vehicle horns, engine sounds, tire noise, music, human speech, dog barking, and other sounds proximate the vehicle 102.

At operation 522, the process may include estimating a direction of the audio event (e.g., direction of arrival) with respect to the vehicle 102 based at least in part on the area of intersection determined at operation 518. At operation 524, the process may include estimating a distance of the audio event from the vehicle 102 based at least in part on the area of intersection determined at operation 518.

At operation 526, the process may include initiating an activity based at least in part on the estimation of the direction of the audio event and the estimation of the distance of the audio event from the vehicle 102. In some examples, the activity may include contacting a remote computing system (e.g., such as a remote teleoperator to request for confirmation of actions or control), changing a threshold in another perception algorithm (e.g., raising or lowering a threshold associated with a confidence level to determine that an object is an emergency object (or some other object)), initiating a vehicle maneuver (e.g., modifying a trajectory, slowing or stopping a vehicle, and the like.

Figure 6:
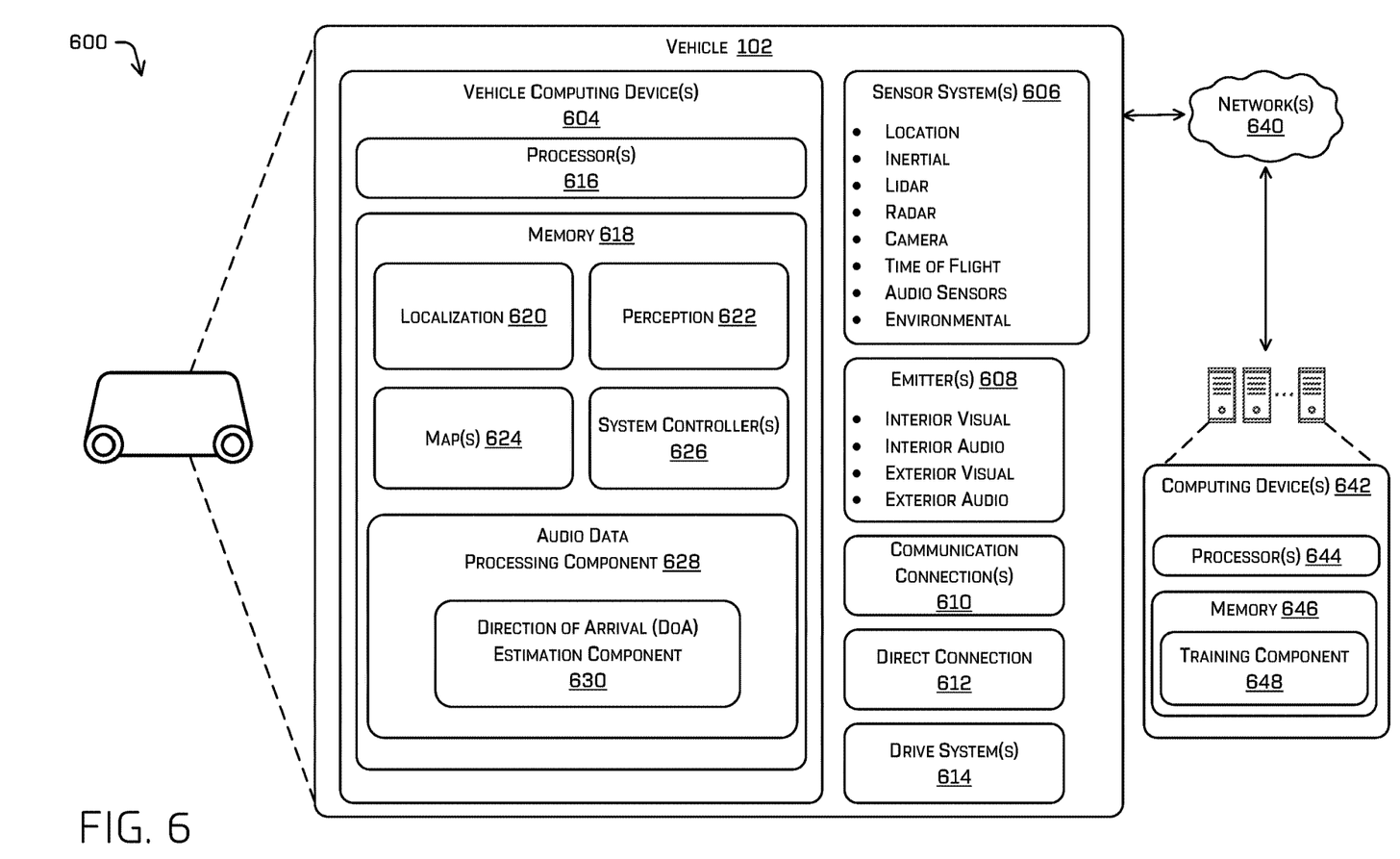
FIG. 6 is an illustration of an example system for implementing the techniques described herein.

FIG. 6 depicts a block diagram of an example system 600 for implementing the techniques described herein. The vehicle 102 may include one or more vehicle computing devices 604 (also referred to as a vehicle computing device 604 or vehicle computing device(s) 604), one or more sensor systems 606, one or more emitters 608, one or more communication connections 610, at least one direct connection 612, and one or more drive systems 614.

The vehicle computing device 604 may include one or more processors 616 and memory 618 communicatively coupled with the one or more processors 616. In the illustrated example, the vehicle 102 is an autonomous vehicle; however, the vehicle 102 could be any other type of vehicle. In the illustrated example, the memory 618 of the vehicle computing device 604 stores a localization component 620, a perception component 622, one or more maps 624, one or more system controllers 626, an audio data processing component 628 comprising at least a direction of arrival (DoA) estimation component 630. Though depicted in FIG. 6 as residing in memory 618 for illustrative purposes, it is contemplated that the localization component 620, the perception component 622, the one or more maps 624, the one or more system controllers 626, the audio data processing component 628, and the direction of arrival (DoA) estimation component 630 may additionally, or alternatively, be accessible to the vehicle 102 (e.g., stored remotely).

In some examples, the DoA estimation component 630 can be based at least in part on a machine learned model that can output a DoA estimate and/or a confidence level associated with such an estimate.

In at least one example, the localization component 620 may include functionality to receive data from the sensor system(s) 606 to determine a position and/or orientation of the vehicle 102 (e.g., one or more of an x-, y-, z-position, roll, pitch, or yaw). For example, the localization component 620 may include and/or request/receive a map of an environment and may continuously determine a location and/or orientation of the autonomous vehicle within the map. In some instances, the localization component 620 may utilize SLAM (simultaneous localization and mapping), CLAMS (calibration, localization and mapping, simultaneously), relative SLAM, bundle adjustment, non-linear least squares optimization, or the like to receive image data, lidar data, radar data, IMU data, GPS data, wheel encoder data, and the like to accurately determine a location of the autonomous vehicle. In some instances, the localization component 620 may provide data to various components of the vehicle 102 to determine an initial position of an autonomous vehicle for generating a trajectory and/or for generating or receiving map data, as discussed herein.

In some instances, the perception component 622 may include functionality to perform object detection, segmentation, and/or classification. In some examples, the perception component 622 may provide processed sensor data that indicates a presence of an entity that is proximate to the vehicle 102 and/or a classification of the entity as an entity type (e.g., car, pedestrian, cyclist, animal, building, tree, road surface, curb, sidewalk, unknown, etc.). In additional or alternative examples, the perception component 622 may provide processed sensor data that indicates one or more characteristics associated with a detected entity (e.g., a tracked object) and/or the environment in which the entity is positioned. In some examples, characteristics associated with an entity may include, but are not limited to, an x-position (global and/or local position), a y-position (global and/or local position), a z-position (global and/or local position), an orientation (e.g., a roll, pitch, yaw), an entity type (e.g., a classification), a velocity of the entity, an acceleration of the entity, an extent of the entity (size), etc. Characteristics associated with the environment may include, but are not limited to, a presence of another entity in the environment, a state of another entity in the environment, a time of day, a day of a week, a season, a weather condition, an indication of darkness/light, etc.

The memory 618 may further include one or more maps 624 that may be used by the vehicle 102 to navigate within the environment. For the purpose of this discussion, a map may be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map may include, but is not limited to: texture information (e.g., color information (e.g., RGB color information, Lab color information, HSV/HSL color information), and the like), intensity information (e.g., LIDAR information, RADAR information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map may include a three-dimensional mesh of the environment. In some instances, the map may be stored in a tiled format, such that individual tiles of the map represent a discrete portion of an environment, and may be loaded into working memory as needed, as discussed herein. In at least one example, the one or more maps 624 may include at least one map (e.g., images and/or a mesh). In some examples, the vehicle 102 may be controlled based at least in part on the map(s) 624. In some examples, the one or more maps 624 may be stored on a remote computing device(s) (such as the computing device(s) 642) accessible via network(s) 640. In some examples, multiple maps 624 may be stored based on, for example, a characteristic (e.g., type of entity, time of day, day of week, season of the year, etc.). Storing multiple maps 624 may have similar memory requirements but increase the speed at which data in a map may be accessed.

In at least one example, the vehicle computing device 604 may include one or more system controllers 626, which may be configured to control steering, propulsion, braking, safety, emitters, communication, and other systems of the vehicle 102. These system controller(s) 626 may communicate with and/or control corresponding systems of the drive system(s) 614 and/or other components of the vehicle 102.

In some examples, the audio data processing component 628 may process the audio data received by a plurality of audio sensors associated with the vehicle 102 and determine an occurrence of an emergency and a direction of the emergency relative to the vehicle based at least in part on the audio data. Such an audio data processing component 628 may comprise a DoA detection component, as described herein (for example, the DoA detection component in FIG. 1, 4, etc.). The direction of arrival (DoA) estimation component 630 may receive the audio data collected by the audio sensor(s) in the sensor system(s) 606, to determine a direction of arrival given various pairs of sensor data as described herein.

In some instances, aspects of some or all of the components discussed herein may include any models, algorithms, and/or machine learning algorithms. For example, in some instances, the components in the memory 618 (and the memory 646, discussed below) may be implemented as a neural network.

As described herein, an exemplary neural network is an algorithm which passes input data through a series of connected layers to produce an output. Each layer in a neural network may also comprise another neural network or may comprise any number of layers (whether convolutional or not). As may be understood in the context of this disclosure, a neural network may utilize machine learning, which may refer to a broad class of such algorithms in which an output is generated based on learned parameters.

Although discussed in the context of neural networks, any type of machine learning may be used consistent with this disclosure. For example, machine learning algorithms may include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Additional examples of architectures include neural networks such as ResNet50, ResNet101, VGG, DenseNet, PointNet, and the like.

In at least one example, the sensor system(s) 606 may include lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, etc.), time of flight sensors, audio sensors, wheel encoders, environment sensors (e.g., temperature sensors, humidity sensors, light sensors, pressure sensors, etc.), etc. The sensor system(s) 606 may include multiple instances of each of these or other types of sensors. For instance, the lidar sensors may include individual lidar sensors located at the corners, front, back, sides, and/or top of the vehicle 102. As another example, the camera sensors may include multiple cameras disposed at various locations about the exterior and/or interior of the vehicle 102. The sensor system(s) 606 may provide input to the vehicle computing device 604. Additionally, or alternatively, the sensor system(s) 606 may send sensor data, via the one or more networks 640, to the one or more computing device(s) at a particular frequency, after a lapse of a predetermined period of time, in near real-time, etc.

The vehicle 102 may also include one or more emitters 608 for emitting light and/or sound, as described above. The emitters 608 in this example include interior audio and visual emitters to communicate with passengers of the vehicle 102. By way of example and not limitation, interior emitters may include speakers, lights, signs, display screens, touch screens, haptic emitters (e.g., vibration and/or force feedback), mechanical actuators (e.g., seatbelt tensioners, seat positioners, headrest positioners, etc.), and the like. The emitters 608 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 102 may also include one or more communication connection(s) 610 that enable communication between the vehicle 102 and one or more other local or remote computing device(s). For instance, the communication connection(s) 610 may facilitate communication with other local computing device(s) on the vehicle 102 and/or the drive system(s) 614. Also, the communication connection(s) 610 may allow the vehicle to communicate with other nearby computing device(s) (e.g., other nearby vehicles, traffic signals, etc.). The communications connection(s) 610 also enable the vehicle 102 to communicate with a remote teleoperation computing device or other remote services.

The communications connection(s) 610 may include physical and/or logical interfaces for connecting the vehicle computing device 604 to another computing device or a network, such as network(s) 640. For example, the communications connection(s) 610 may enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.) or any suitable wired or wireless communications protocol that enables the respective computing device to interface with the other computing device(s).

In at least one example, the vehicle 102 may include one or more drive systems 614. In some examples, the vehicle 102 may have a single drive system 614. In at least one example, if the vehicle 102 has multiple drive systems 614, individual drive systems 614 may be positioned on opposite ends of the vehicle 102 (e.g., the front and the rear, etc.). In at least one example, the drive system(s) 614 may include one or more sensor systems to detect conditions of the drive system(s) 614 and/or the surroundings of the vehicle 102. By way of example and not limitation, the sensor system(s) may include one or more wheel encoders (e.g., rotary encoders) to sense rotation of the wheels of the drive systems, inertial sensors (e.g., inertial measurement units, accelerometers, gyroscopes, magnetometers, etc.) to measure orientation and acceleration of the drive system, cameras or other image sensors, ultrasonic sensors to acoustically detect objects in the surroundings of the drive system, lidar sensors, radar sensors, etc. Some sensors, such as the wheel encoders may be unique to the drive system(s) 614. In some cases, the sensor system(s) on the drive system(s) 614 may overlap or supplement corresponding systems of the vehicle 102 (e.g., sensor system(s) 606).

The drive system(s) 614 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 614 may include a drive system controller which may receive and preprocess data from the sensor system(s) and to control operation of the various vehicle systems. In some examples, the drive system controller may include one or more processors and memory communicatively coupled with the one or more processors. The memory may store one or more components to perform various functionalities of the drive system(s) 614. Furthermore, the drive system(s) 614 also include one or more communication connection(s) that enable communication by the respective drive system with one or more other local or remote computing device(s).

In at least one example, the direct connection 612 may provide a physical interface to couple the one or more drive system(s) 614 with the body of the vehicle 102. For example, the direct connection 612 may allow the transfer of energy, fluids, air, data, etc. between the drive system(s) 614 and the vehicle. In some instances, the direct connection 612 may further releasably secure the drive system(s) 614 to the body of the vehicle 102.

In some examples, the vehicle 102 may send sensor data to one or more computing device(s) 642 via the network(s) 640. In some examples, the vehicle 102 may send raw sensor data to the computing device(s) 642. In other examples, the vehicle 102 may send processed sensor data and/or representations of sensor data to the computing device(s) 642. In some examples, the vehicle 102 may send sensor data to the computing device(s) 642 at a particular frequency, after a lapse of a predetermined period of time, in near real-time, etc. In some cases, the vehicle 102 may send sensor data (raw or processed) to the computing device(s) 642 as one or more log files. The computing device(s) 642 may include processor(s) 644 and a memory 646 storing a training component 648.

In some instances, the training component 648 may include functionality to train a machine learning model to generate the DoA value associated with a detected emergency vehicle. Further, the training component 648 may include functionality to train a model to output a confidence level associated with such a DoA value, which may be used to determine a region of ambiguity, as discussed herein. For example, the training component 648 may receive a set of audio data associated with an emergency events, as well as features/parameters associated therewith. In some cases, the set of audio data may represent sounds in an environment for a period of time, such as 5 minutes, 5 hours, 1 day, 1 week, and the like. At least a portion of the set of audio data may be used as an input to train the machine learning model, and at least a portion of the set of audio data may be used as ground truth information for training the machine learning model. As a non-limiting example, a first set (e.g., 3, 4, 5, or more) of a sequence of audio data frames may be input into the machine learned model. A second set of audio data (or feature information associated therefrom—e.g., by extracting an angular spectrum, peaks of the angular spectrum and/or TDoA values at peaks from the angular spectrum, etc.) in the sequence of audio data frames immediately preceding the first set may then be used as ground truth for training the model. Thus, by providing audio data of past detected emergency vehicles in an environment, the DoA detection component may detect an occurrence of emergency vehicles and the orientation of the emergency vehicles efficiently, as discussed herein.

In some examples, the training component 648 may include training data that has been generated by a simulator. For example, simulated training data may represent examples where testing audio sources in an environment, to provide additional training examples.

The processor(s) 616 of the vehicle 102 and the processor (s) 644 of the computing device(s) 642 may be any suitable processor capable of executing instructions to process data and perform operations as described herein. By way of example and not limitation, the processor(s) 616 and 644 may comprise one or more Central Processing Units (CPUs), Graphics Processing Units (GPUs), or any other device or portion of a device that processes electronic data to transform that electronic data into other electronic data that may be stored in registers and/or memory. In some examples, integrated circuits (e.g., ASICs, etc.), gate arrays (e.g., FPGAs, etc.), and other hardware devices may also be considered processors in so far as they are configured to implement encoded instructions.

Memory 618 and 646 are examples of non-transitory computer-readable media. The memory 618 and 646 may store an operating system and one or more software applications, instructions, programs, and/or data to implement the methods described herein and the functions attributed to the various systems. In various implementations, the memory may be implemented using any suitable memory technology, such as static random-access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some instances, the memory 618 and 646 may include at least a working memory and a storage memory. For example, the working memory may be a high-speed memory of limited capacity (e.g., cache memory) that is used for storing data to be operated on by the processor(s) 616 and 644. In some instances, the memory 618 and 646 may include a storage memory that may be a lower-speed memory of relatively large capacity that is used for long-term storage of data. In some cases, the processor(s) 616 and 644 may not operate directly on data that is stored in the storage memory, and data may need to be loaded into a working memory for performing operations based on the data, as discussed herein.

It should be noted that while FIG. 6 is illustrated as a distributed system, in alternative examples, components of the vehicle 102 may be associated with the computing device(s) 642 and/or components of the computing device(s) 642 may be associated with the vehicle 102. That is, the vehicle 102 may perform one or more of the functions associated with the computing device(s) 642, and vice versa.

EXAMPLE CLAUSES

A. A system comprising: one or more processors; and one or more non-transitory computer-readable media storing instructions executable by the one or more processors, wherein the instructions, when executed, cause the system to perform operations comprising: receiving first audio data from a first audio sensor associated with a vehicle; receiving second audio data from a second audio sensor associated with the vehicle, wherein the first audio sensor and the second audio sensor represent a first pair of audio sensors; determining a first confidence level associated with the first pair of audio sensors; determining a first region of ambiguity associated with the first pair of audio sensors; receiving third audio data from a third audio sensor associated with the vehicle; receiving fourth audio data from a fourth audio sensor associated with the vehicle, wherein the third audio sensor and the fourth audio sensor represent a second pair of audio sensors; determining a second confidence level associated with the second pair of audio sensors; determining a second region of ambiguity associated with the second pair of audio sensors; determining, based at least in part on the first region of ambiguity, the first confidence level, the second region of ambiguity, and the second confidence level, a region of intersection; and determining, based at least in part on the region of intersection, a direction of arrival of an audio event.

B. The system of paragraph A, the operations further comprising: determining, based at least in part on the region of intersection, a distance between the audio event and the vehicle.

C. The system of paragraph A or B, wherein determining the first confidence level is based at least in part on at least one of an audio data sampling rate, a hardware latency uncertainty, or a noise profile.

D. The system of any of paragraphs A-C, the operations further comprising: controlling the vehicle based at least in part on the direction of arrival.

E. The system of any of paragraphs A-D, wherein the first pair of audio sensors comprises a pair of audio sensors at a first time and the second pair of audio sensors comprises the pair of audio sensors at a second time different from the first time.

F. A method comprising: receiving first audio data from a first pair of audio sensors; determining a first region of ambiguity associated with the first pair of audio sensors; receiving second audio data from a second pair of audio sensors; determining a second region of ambiguity associated with the second pair of audio sensors; determining an area of intersection of the first region of ambiguity and the second region of ambiguity; and determining a direction of arrival of an audio event based on the area of intersection.

G. The method of paragraph F, further comprising determining a distance between the audio event and the vehicle based on the area of intersection.

H. The method of paragraph F or G, further comprising: determining a first confidence level associated with the first audio data; and determining a width of the first region of ambiguity based at least in part on the first confidence level.

I. The method of any of paragraphs F-H, wherein determining the first region of ambiguity is based at least in part on a time difference of arrival.

J. The method of any of paragraphs F-I, wherein determining the first confidence level is based on at least one of a classification of the audio event, peak cross-correlation values, a signal lag, a hardware latency, a noise profile, a sampling rate, or an internal system error.

K. The method of any of paragraphs F-J, further comprising: accessing map data associated with an area proximate the vehicle; determining, based on the map data, a probability that the first audio data comprises reflected audio data; and discarding the first audio data that based at least in part on the probability is determined to be reflected audio data.

L. The method of any of paragraphs F-K, wherein the first pair of audio sensors comprises a pair of audio sensors at a first time and the second pair of audio sensors comprises the pair of audio sensors at a second time different than the first time.

M. The method of any of paragraphs F-L, further comprising: determining a first confidence level associated with the first audio data; determining that the first confidence level is below a threshold confidence value; and determining an updated direction of arrival based at least in part on the first confidence level being less than or equal to the threshold confidence value.

N. The method of any of paragraphs F-M, wherein determining the first region of ambiguity is based on a hyperbolic function.

O. The method of any of paragraphs F-N, further comprising: initiating an activity based at least in part on the direction of arrival of the audio event, wherein the activity comprises at least one of contacting a remote computing system, changing a threshold in a perception algorithm, or initiating a vehicle maneuver.

P. The method of any of paragraphs F-O, wherein the audio event comprises an emergency vehicle acoustic notification.

Q. One or more non-transitory computer-readable media storing instructions that, when executed, cause one or more processors to perform operations comprising: receiving first audio data from a first pair of audio sensors; determining a first region of ambiguity associated with the first pair of audio sensors; receiving second audio data from a second pair of audio sensors; determining a second region of ambiguity associated with the second pair of audio sensors; determining an area of intersection of the first region of ambiguity and the second region of ambiguity; and determining a direction of arrival of an audio event based on the area of intersection.

R. The one or more non-transitory computer-readable media of paragraph Q, wherein the operations further comprise: determining a distance between the audio event and the vehicle based on the area of intersection.

S. The one or more non-transitory computer-readable media of paragraph Q or R, wherein the operations further comprise: determining a first confidence level associated with the first audio data; and determining a width of the first region of ambiguity based at least in part on the first confidence level.

T. The one or more non-transitory computer-readable media of any of paragraphs Q-S, wherein the first pair of audio sensors comprises a pair of audio sensors at a first time and the second pair of audio sensors comprises the pair of audio sensors at a second time different than the first time.

While the example clauses described above are described with respect to one particular implementation, it should be understood that, in the context of this document, the content of the example clauses can also be implemented via a method, device, system, computer-readable medium, and/or another implementation. Additionally, any of examples A-T may be implemented alone or in combination with any other one or more of the examples A-T.

CONCLUSION

While one or more examples of the techniques described herein have been described, various alterations, additions, permutations and equivalents thereof are included within the scope of the techniques described herein. In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:
one or more processors; and
one or more non-transitory computer-readable media storing instructions executable by the one or more processors, wherein the instructions, when executed, cause the system to perform operations comprising:
receiving first audio data from a first audio sensor associated with a vehicle;
receiving second audio data from a second audio sensor associated with the vehicle, wherein the first audio sensor and the second audio sensor represent a first pair of audio sensors;
determining a first confidence level associated with the first pair of audio sensors;
determining a first region of ambiguity associated with the first pair of audio sensors;
receiving third audio data from a third audio sensor associated with the vehicle;
receiving fourth audio data from a fourth audio sensor associated with the vehicle, wherein the third audio sensor and the fourth audio sensor represent a second pair of audio sensors;
determining a second confidence level associated with the second pair of audio sensors;
determining a second region of ambiguity associated with the second pair of audio sensors;
determining, based at least in part on the first region of ambiguity, the first confidence level, the second region of ambiguity, and the second confidence level, a region of intersection; and
determining, based at least in part on the region of intersection, a direction of arrival of an audio event.

2. The system of claim 1, the operations further comprising:
determining, based at least in part on the region of intersection, a distance between the audio event and the vehicle.

3. The system of claim 1, wherein determining the first confidence level is based at least in part on at least one of an audio data sampling rate, a hardware latency uncertainty, or a noise profile.

4. The system of claim 1, the operations further comprising:
controlling the vehicle based at least in part on the direction of arrival.

5. The system of claim 1, wherein the first pair of audio sensors comprises a pair of audio sensors at a first time and the second pair of audio sensors comprises the pair of audio sensors at a second time different from the first time.

6. A method comprising:
receiving first audio data from a first pair of audio sensors;
determining, based at least in part on a confidence level associated with the first audio data, a first region of ambiguity associated with the first pair of audio sensors;
receiving second audio data from a second pair of audio sensors;
determining a second region of ambiguity associated with the second pair of audio sensors;
determining an area of intersection of the first region of ambiguity and the second region of ambiguity; and
determining a direction of arrival of an audio event based on the area of intersection.

7. The method of claim 6, further comprising determining a distance between the audio event and a vehicle based on the area of intersection.

8. The method of claim 6, further comprising:
determining a width of the first region of ambiguity based at least in part on the confidence level.

9. The method of claim 6, wherein determining the first region of ambiguity is based at least in part on a time difference of arrival.

10. The method of claim 6, further comprising determining the confidence level based on at least one of a classification of the audio event, peak cross-correlation values, a signal lag, a hardware latency, a noise profile, a sampling rate, or an internal system error.

11. The method of claim 6, further comprising:
accessing map data associated with an area proximate a vehicle;
determining, based on the map data, a probability that the first audio data comprises reflected audio data; and
discarding the first audio data that based at least in part on the probability.

12. The method of claim 6, wherein the first pair of audio sensors comprises a pair of audio sensors at a first time and the second pair of audio sensors comprises the pair of audio sensors at a second time different than the first time.

13. The method of claim 6, further comprising:
determining that the confidence level is below a threshold confidence value; and
determining an updated direction of arrival based at least in part on the confidence level being less than or equal to the threshold confidence value.

14. The method of claim 6, wherein determining the first region of ambiguity is based on a hyperbolic function.

15. The method of claim 6, further comprising:
initiating an activity based at least in part on the direction of arrival of the audio event, wherein the activity comprises at least one of contacting a remote computing system, changing a threshold in a perception algorithm, or initiating a vehicle maneuver.

16. The method of claim 6, wherein the audio event comprises an emergency vehicle acoustic notification.

17. One or more non-transitory computer-readable media storing instructions that, when executed, cause one or more processors to perform operations comprising:
receiving first audio data from a first pair of audio sensors;
determining, based at least in part on a confidence level associated with the first audio data, a first region of ambiguity associated with the first pair of audio sensors;

receiving second audio data from a second pair of audio sensors;

determining a second region of ambiguity associated with the second pair of audio sensors;

determining an area of intersection of the first region of ambiguity and the second region of ambiguity; and determining a direction of arrival of an audio event based on the area of intersection.

18. The one or more non-transitory computer-readable media of claim 17, wherein the operations further comprise:

determining a distance between the audio event and a vehicle based on the area of intersection.

19. The one or more non-transitory computer-readable media of claim 17, wherein the operations further comprise:

determining a width of the first region of ambiguity based at least in part on the confidence level.

20. The one or more non-transitory computer-readable media of claim 17, wherein the first pair of audio sensors comprises a pair of audio sensors at a first time and the second pair of audio sensors comprises the pair of audio sensors at a second time different than the first time.

* * * * *